UNITED STATES PATENT OFFICE.

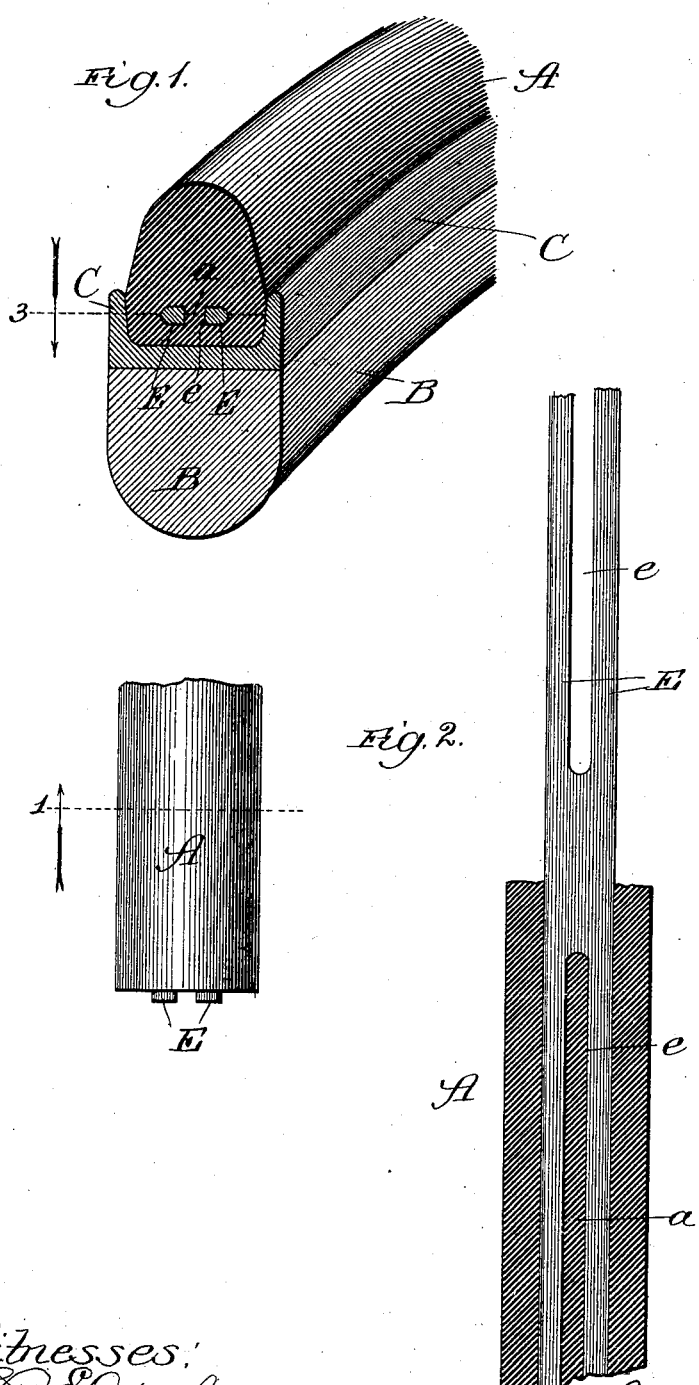

JOHN F. McGUIRE, OF AKRON, OHIO.

CUSHION-TIRE FOR VEHICLES.

SPECIFICATION forming part of Letters Patent No. 660,452, dated October 23, 1900.

Application filed April 20, 1900. Serial No. 13,630. (No model.)

*To all whom it may concern:*

Be it known that I, JOHN F. MCGUIRE, a citizen of the United States, residing at Akron, in the county of Summit and State of Ohio, have invented certain new and useful Improvements in Cushion-Tires for Vehicles, of which the following is a specification.

The invention relates to that class of tires known as "cushion-tires," and particularly to that class of tires which are formed or made of solid rubber and adapted to be used in connection with the ordinary vehicles, such as carriages and the like.

The particular object of the invention is to provide a simple, economical, and efficient cushion-tire.

A further object of the invention is to provide a simple, economical, and efficient solid-rubber tire with means by which it may be securely held in operative position on the rim of a vehicle-wheel.

The invention consists in the features, combinations, and details of construction hereinafter described and claimed.

In the accompanying drawings, Figure 1 is a perspective view of a portion of a cushion-tire, securing-band, and wheel-felly; Fig. 2, a plan view of the same; Fig. 3, a detailed view, partly in section, taken on the line 3 of Fig. 1 looking in the direction of the arrow.

In the art to which this invention relates it is well known that cushion-tires are, on account of longevity, the most desirable for large vehicles—such as carriages, cabs, and the like—and that one of the serious objections to the use of this kind of tires is their liability to spring or strip off the rim when the cab is turning a corner or when they are expanded by sudden stress and strains. In order to overcome this objection, various fastening devices have been used, which are more or less efficient. My improvement, therefore, is intended to provide a cushion-tire formed of rubber or similar cushioning material with means by which it may be efficiently held in operative position, all of which will appear from an examination of the drawings and the following description and claim.

In constructing a tire in accordance with my improvements I use a portion A, formed of rubber or similar yielding material and molded to the desired size and shape, preferably that shown in Fig. 1. This portion is the tire proper and, as above suggested, is formed of rubber vulcanized to the desired consistency, so that it becomes a fairly-good cushion and acts to minimize when in proper position the shocks and jars due to the tire striking obstructions on the ordinary road. This cushion is used in connection with the ordinary felly B of the desired vehicle-wheel upon which is placed a rim formed of an ordinary metallic channel-plate C. This rim C is secured to the felly in any desired manner, either by bolting or by ordinary wood-screws.

To hold the tire in its proper place in the rim and to prevent its being torn or twisted out of its seat, I employ a band E, which consists of two narrow flat metal strips having an open space e between. These strips are located on opposite sides of the center of the tire and are so spaced that they have or are permitted an independent transverse movement. The strips are united at long intervals by short integral webs, as shown in Fig. 3, and in practice it has been found that two or three of such webs will answer to hold the strips in proper parallelism. These webs also perform the additional function of preventing a relative longitudinal movement between the tire and strips as the rubber passes into the space e. The advantage of this construction is that there is very little liability for displacement of the band and little or no liability for the twisting or distorting of the bands, which if it were a single wide band would be liable to twist or warp and tend to throw or strip the cushion from the wheel-rim. The forming of the tire in connection with these bands is made by running the bands into the tire on a tubing-machine and curing the whole in a solid mass in a proper mold. The bands thereby become practically a part of the tire and practically more so than one or more independent wires could.

In placing the tire in position it will be understood that it is formed in a long strip of about the length of the periphery of the wheel to which it is to be applied. The double band is slightly longer than the rubber portion, so that the ends project, as shown in Fig. 2. The rubber portion at each end is pushed back considerably for the space of perhaps an inch or more. The tire is then placed on the wheel and the ends of the metallic bands secured together, either by bracing, electric welding, or riveting, as may seem desirable or necessary. When the ends of the bands are secured together, the ends of the rubber are brought forward until they meet and are then cemented together, and the tire is in position for use, as shown in Fig. 1.

I am aware that bands have been made of perforated sheet metal having beaded edges and also that parallel wires have been suggested. Such devices do not, however, possess the quality or utility of my construction, which may be stated as producing the good results of both the wire and wide perforated band forms without the objectionable quality of twisting or breaking found in the latter, nor the spreading, cutting, and creeping tendency of the former.

I claim—

In a tire of the character described, the combination with a channeled rim, of a rubber tire having embedded therein two narrow flat metal bands spaced apart and united at remote intervals by flat narrow integral webs, the rubber of the tire passing between the bands substantially as described.

JOHN F. McGUIRE.

Witnesses:
P. W. LEAVITT,
W. J. O'NEIL.